United States Patent Office 3,794,481
Patented Feb. 26, 1974

3,794,481
METAL FOAMS AND PROCESS THEREFOR
Leonard M. Niebylski, Birmingham, Chester P. Jarema, Detroit, and Peter A. Immethun, Southfield, Mich., assignors to Ethyl Corporation, Richmond, Va.
No Drawing. Continuation-in-part of abandoned application Ser. No. 202,603, Nov. 26, 1971. This application Feb. 12, 1973, Ser. No. 331,620
Int. Cl. C21d 1/18
U.S. Cl. 75—20 F
11 Claims

ABSTRACT OF THE DISCLOSURE

Metal foams produced from heat treatable alloys can be given improved strength by maintaining them, for a time sufficient for strengthening to occur, at a temperature at which a solid solution solute formation occurs. Additional strength can be achieved by subsequently subjecting the foam to a precipitation hardening. Preferred foams are of aluminum alloys, especially where the aluminum is alloyed with copper, magnesium, zinc or silicon.

REFERENCE TO RELATED APPLICATION

This application is a continuation-in-part of application Ser. No. 202,603, filed Nov. 26, 1971, and now abandoned.

BACKGROUND OF THE INVENTION

Foamed metals have been described; see, for example, U.S. 2,895,819; 3,300,296; and 3,297,431. In general such foams are produced by adding a gas-evolving compound to a molten metal and heating the mixture to decompose the compound to prepare blowing gas. The gas expands causing the metal to foam. After foaming, the resultant body is cooled to form a foamed solid. The gas foaming solid can be a metal hydride such as $TiH_2$, $ZrH_2$, or lithium hydride, U.S. 2,983,597.

Such foams can be improved by increasing their strength. This invention satisfies that object.

SUMMARY OF THE INVENTION

This invention provides a process for strengthening metal foams as well as improved foams produced thereby. This invention provides a process for increasing the strength of a set foam of a solid solution alloy, said process comprising maintaining said foam for a time sufficient for strengthening to take place at a temperature at at which solid solution solute formation occurs, said temperature being below the melting point of the foam, and subsequently rapidly cooling said foam below said temperature. In a preferred embodiment, this process is followed by heating the foam to a slightly elevated temperature for a time sufficient for precipitation hardening to occurs; this further increases the strength of the foam.

These processes can be conducted in a number of ways. First, after the foam is made by expanding a foamable metal mass, it is not allowed to cool to ambient temperature as in the processes of the art, rather, during the initial cooling the foam is allowed to cool until it is from about 1° to about 35° C. below the melting point. Thereafter, the foam is cooled very slowly in order to allow it to be within the range of temperatures—which afford formation of solid solution solute—for a time sufficient for strengthening to take place. This slow cooling is conducted by conserving heat within the foam mass being treated. This heat conservation can be conducted by using insulating means, for example, a mold in which the foam was cast. In a second method, after the foam is made, it is allowed to cool to ambient temperature. Thereafter, it is reheated to a temperature (below the melting point) which causes formation of solid solution solute. As in the first method, after rapid cooling, the foam can be subjected to a precipitation heat treat. The third method is like the second; in it the foamed mass is not allowed to cool to room temperature, but after cooling somewhat it is heated to a temperature which affords formation of solid solution solute. Thereafter, the mass is rapidly cooled and then can be subjected to a precipitation heat treat.

The rapid cooling is preferably carried out using a water quench. This can be conducted using water immersion or a spray of water. In order to protect the foam from adverse action of water at elevated temperature, the water quench can be carried out while the foam is shrouded by a substantially water-tight jacket.

Of the alloys affording foams which can be treated according to this invention, aluminum alloys are preferred, especially those where the aluminum is alloyed with copper, magnesium, zinc or silicon. Typical alloys are those within the 2000 and 7000 series of alloys; those designations being Aluminum Association numbers. The improved foams produced by the above process have the many uses metal foams have and are especially efficacious where higher strength foams are desired. Foams produced by this invention are useful as structural materials in the building and transportation industry. Thus, they can be used, for examples, in exterior or interior curtain walls, or in floors, sides or doors in trailers and other vehicles.

DESCRIPTION OF PREFERRED EMBODIMENTS

Of the alloys used to make foams, the preferred ones for this invention are aluminum alloys. Of these, heat treatable aluminum alloys are preferred; applicable alloys of this type are aluminum alloys of the 2000 and 7000 series—those designations being Aluminum Association numbers. Preferably, the alloy contains up to about 85 wt. percent aluminum, more preferably up to about 90 wt. percent; the remainder being one or more alloying elements. Of the alloying elements, magnesium, copper, silicon and zinc are preferred. With regard to the alloying elements, the following table gives preferred and most preferred concentration ranges in weight percent.

TABLE I

| Metal | Percent Preferred | Most preferred |
|---|---|---|
| Magnesium | 0.5–10 | 1–5 |
| Copper | 0.5–15 | 1–10 |
| Silicon | 0.1–0.5 | 0.1–15 |
| Zinc | 0.5–12 | 0.5–10 |

Mixtures of these metals can be used; a preferred mixture being magnesium, up to 5 wt., and up to 10% of copper or zinc, or up to 15/ silicon. Another mixture is from 0.5 to 10 weight percent zinc and up to about 4 weight percent copper.

In addition to the above, applicable alloys may have say up to about 5% of other metals commonly found in aluminum alloys such as iron, manganese chromium, nickel or titanium. Typical preferred heat treatable aluminum alloys which can be used are (Aluminum Association numbers) 2024, 2214, 7001, 7049 and 7075. These have the following compositions as given in Registration Record of Aluminum Association Alloy Designations and Chemical Composition Limits for Aluminum Alloys in the Form of Castings and Ingot, published by The Aluminum Association 7550 Third Ave., New York, N.Y. 10017 (Nov. 1, 1969).

AA number:

2024:Si, 0.050; Fe, 0.50; Cu 3.8–4.9; Mn, 0.30–0.9; Mg. 1.2–1.8; Cr 0.10; Zn, 0.25; others total, 0.15; remainder aluminum 2214: Si, 0.50–1.2; Fe, 0.25; Cu, 3.9–5.0; Mn, 0.40–1.2, Mg, 0.20–0.8; Cr, 0.10; Zn, 0.25; others total 0.15; remainder aluminum 7001: Si, 0.35; Fe, 0.40; Cu, 1.6–2.6; Mn, 0.20; Mg, 2.6–3.4; Cr, 0.18–0.35; Zn, 6.8–8.0; Ti, 0.20; others total, 0.15; remainder aluminum 7049: Si, 0.25; Fe, 0.35; Cu, 1.2–1.9; Mn, 0.20; Mg, 2.0–2.9; Cr, 0.10–0.22; Zn, 7.2–8.2; Ti, 0.10; others total, 0.15; remainder aluminum 7075: Si, 0.40; Fe, 0.50; Cu, 1.2–2.0; Mn, 0.30; Mg, 2.1–2.9; Cr, 0.18–0.35; Zn, 5.1–6.1; Ti, 0.20; others total, 0.15; remainder aluminum.

A heat treatment used in this invention is to obtain, in solid solution, solid solution solutes such as those containing copper, magnesium, silicon or zinc. In general solubilities of these materials increases with temperature; in many instances the solubility is greatly increased just below the melting temperature. The most favorable temperature for working is very near that at which melting occurs. Actually melting should be avoided or reduced however, since it produces networks between grains which decrease strength somewhat. Accordingly, for this invention, a hardening step is conducted as close as convenient to the melting point. Good results are achhieved from about 1°–35° below the melting point and a convenient range is about 10°–35° C. below the melting temperature.

The time required for the heating step is that required for strengthening to occur. This temperature will vary to some extent on the alloy, the foaming procedure used, and the size and shape of the foam mass being treated. Thicker sections can be maintained at strengthening temperature for up to about 8, 12, 24 or 36 hours or more, while thinner foamed sheets or sections may require 10 minutes to 2 to 4 hours or so. As a general rule, 2–3 hours per each inch thickness of the article is used. When bringing the mass to working temperature, care should be taken that the heating is slow enough to avoid localized melting and long enough for all, substantially all, or the portion of the mass desired to be strengthened to reach temperature at which strengthening occurs.

At least until some experience is gained, the practitioner may wish to first determine the melting point of the alloy or foam to be treated, examine rates of heating to establish that desired for the object(s) being treated, and follow strength improvement *versus* time at the strengthening temperature used. These means of determining particular process parameters can be conducted by simple, routine experimentation.

Following the heat treat step described above, the heated object is rapidly cooled to some lower temperature, usually near room temperature. This quenching step can be conducted in a number of ways, usually comprising contacting the object with a relatively cool liquid like water or oil; water is preferred. Quenching can be conducted by immersing the foam in the liquid. In many instances where the foamed object does not have an impermeable skin covering substantially the entire surface, this technique is not of choice because the foam imbibes water and/or reacts to cause an untoward amount of oxidation. In some instances these bad effects can be overcome by immersing a substantially watertight vessel containing the foam. In some instances this is not the manner of choice because the surrounding vessel retards heat dissipation and makes the quenching take longer. In general, best results are achieved by spraying cooling water on the foam, a plurality of water jets can be used and one or more can be played say in a back and forth motion across the surface being quenched. It has been found that water imbibition by the foam is low or nonexistent when cooled with jetted water.

In general, the more rapid the cooling the greater strength achieved. However, as appreciated by a skilled practitioner, some care must be taken so quenching is not too rapid, since stresses may be set up which can decrease strength somewhat. In general one or more jets (such as from a garden hose) of water at temperature ambient temperatures yields satisfactory results.

In many instances upon standing after quench, the foams will increase in strength. This ageing process can be accelerated by subjecting the foam after quench to a relatively mild temperature treatment. This precipitation hardening or precipitation heat treat is usually effected by heating to about 100° to about 250° C., preferably about 115° to about 135° C., for a time sufficient for the increase in strength to occur. The temperature used will depend at least to some extent on alloy composition. The temperature will be employed for a time period which is at least somewhat dependent on the same or analogous variable as exemplified above.

In general 1 to 125 hours or more are used, greater times generally can be used for bigger objects or masses of foam. More than one temperature can be employed for example 3 hours at 100° C. plus 12 hours at 150° C. The temperature or temperature and time or times desirable for a given case can be determined by experience or simple routine experimentation. For some alloys the precipitation hardening should begin shortly after quench since delays may be detrimental. For other alloys, delays can be tolerated and in many instances longer delays are better than short delays.

In general, the process of this invention can be used with foams of wide density range. When working with aluminum foams, those having a density of from about 5 to about 100 pcf. are used. Preferably the aluminum foams have a density of from about 8 to about 40 pfc., more preferably from about 8 to about 30 pounds per cubic foot.

The process of this invention works well on bare foams as well as foams with all or part of the surface covered with metal surface or skin. Such surface layer may be made while the foam is prepared, say, by casting and using a mold which is relatively cool or extruding. Alternatively, the metal layer may be a lamina appended on a foam body in a variety of ways. One way is to heat a foam surface with a hot platen and then applying a metal sheet to the foam surface melted or softened with the platen; on cooling, the metal sheet will be more or less fused to the foam surface. Moreover, the surface may be bonded to a nonporous metal body by welding, brazing, dipping, pouring, metallizing by flame or plasma spray, electrochemical plating, chemical plating, electrophoresis, compression bonding, coining or similar technique. The process of this invention can strengthen the non-foamed metal layer where the layer is of the same or similar alloy or otherwise susceptible to strengthening through heating at the temperature range or ranges employed. Utilizing the process of this invention in this way, one can strengthen sandwich structures such as those described in applications, Ser. Nos. 30,469, 155,101, and 155,103, the first filed on Apr. 20, 1970, the latter two on June 21, 1971. These applications have a common assignee with the instant application and are incorporated by reference herein as if fully set forth. Alternative to heat treating a composite article, the parts thereof can be strengthened and then assembled according to the teachings of the above cited applications.

The solution heat treat can be carried out in a number of ways. For example, a temperature range where solid solution solute formation occurs is reached by the initial cooling of the foam after foaming. Solute formation can be made to occur at this temperature by maintaining it when reached on initial cooling through conservation of heat within the foam. Heat conservation may be effected by insulating the foam. Where insulation is not sufficient when working in ambient atmosphere, the foam can be kept in an oven at the desired temperature range. Alternatively, heat can be applied in other ways as by induction heating or by playing torches over the surface or via radiation heat treatment, for example.

Alternatively, the solution heat treat can be conducted after the foam has cooled to temperatures below the desired range. In such instances, the foam can be reheated to temperature. Reheating is feasible if the foam has cooled to ambient temperature (or below) or if the foam has only cooled to a temperature between such temperatures and the temperature of foam formation. Reheating can be accomplished by the means mentioned above to augment the heat conserved in the foam. When reheating or maintaining temperature, care should be taken to avoid formation of liquid phase through melting. Melting causes dissipation or loss of strength increase presumably by causing deformation or decomposition of solid solution solutes formed, or prevention of their formation. Accordingly, careful application of heat is preferred. While this invention pertains to heating foamed mass and structures containing same whilst maintaining the treated mass in the solid phase, it is to be understood that a minor amount of melting can be tolerated. Heating in the solid phase as prescribed by this invention provides strength increase; all other items being equal, the greater amount of increase occurs when no liquid phase is formed, however, benefit will be achieved so long as the effect caused by melting doesn't cancel out in toto the benefits this invention provides.

It appears the beneficial results afforded by this invention are conferred by obtaining solid solution solues within the alloy of which the foam is made. By solid solution solutes is meant discreet atoms of alloying elements dispersed in the aluminum, by substitution for aluminum atoms in an aluminum crystal lattice, or dispersed interstitially in the lattice as an interstitial solid solution.

To a greater or lesser extent, formation of solid solution solutes will result in a more or less homogeneous crystalline phase composed of two or more elements. The various substances will be distributed in a random fashion among the various lattice sites. In general, no long range order exists in the distribution of the two or more kinds of atoms.

As a general rule, in aluminum base systems about 7 to about 11 percent of solute is the upper limit which will form a solid solution in the aluminum.

Any remainder of material will be present in discreet "islands" interspersed usually in a non-uniform fashion throughout the metal mass.

The milder heat treatment following the quench used in this invention may be referred to as precipitation heat treat. Precipitation heat treat, as mentioned above, also affords enhancement in foam strength. It is believed this enhancement is achieved by the islands of interspersed materials reacting with aluminum—and perhaps other specie or species present to form intermetallic compounds.

In some instances, it is desirable to conduct the process of this invention in the presence of an inert atmosphere. Such an atmosphere is useful in mitigating any untoward action of oxygen on the mass being treated. Nitrogen can be employed and other inert gases which can be used are carbon dioxide, argon, neon, and mixtures of such gases.

Foams of this invention can be prepared by any suitable technique, for example, the prior art methods of U.S. 2,983,597, 2,895,819, 3,300,296, or 3,297,431 can be used. Alternatively, the mass to be foamed can be treated with a viscosity increasing amount of a viscosity increasing agent such as air, oxygen, nitrogen, argon, water, and the like. Accordingly, the process of French patent application 7006045 or the techniques within U.S. application, Ser. No. 123,099, filed Mar. 10, 1971, can be used. That application has a common assignee with the instant application and is incorporated by reference herein as if fully set forth.

To further illustrate this invention, the following non-limiting examples are presented.

EXAMPLE 1

Using the technique of application, Ser. No. 123,099 filed Mar. 10, 1971, a 6800 g. portion of alloy 7075 was thickened using 140 grams of solid $CO_2$. Thereafter, 27.5 g. of $ZrH_2$ was added with intensive mixing. The $ZrH_2$ was added in five aluminum foil wrapped packets of approximately 5 g. each. and the resultant mixture was allowed to foam at 685° C. in a mold having dimensions 15" x 15" x 4⅝". The mold was fabricated of ½" steel. Two thermocouple probes were inserted, one near the center and another near a corner of the foaming mass. These could relate the temperature gradient between the exterior of the casting and its core. When the thermocouple near the center reached 325° C. the mold (with lid removed) and foam casting were rapidly quenched with tap water spray until ambient temperature was reached. The casting was cut through the center to give two pieces 7½" x 15" x 4½". One piece was subjected to compressive strength testing using 2" x 2" x 1" specimens cut out of the half segment bun. The other segment was subjected to precipitation heat treat at 125° C. for 24 hours and likewise subjected to compressive strength temperature. The results are shown in the following table.

The above procedure was substantially followed in a number of runs except quenching was initiated at 490° C., 500° C., 500° held 7 minutes before quenching, 500° C. held 12 minutes before quenching, and 505° C. These results are also set forth in the following table.

In the table a range of densities is given; the figures are the lowest and highest densities noted for the 2" x 2" x 1" specimens taken. The next column—strength of foam p.s.i./lb. gives the values for the samples of lowest and highest densities.

| Run | Temperature of quench, °C. | Foam density, p.c.f. | Strength of foam, p.s.i./p.c.f. | Treatment after quenching |
|---|---|---|---|---|
| 1 | 325 | 20.4-24.7 | 36.7-43.5 | None. |
| 1A | 325 | 21.0-21.7 | 44.0-49.0 | 125° C., 24 hours. |
| 2 | 490 | 23.2-24.4 | 39.9-48.8 | None. |
| 2A | 490 | 20.3-23.6 | 47.1-55.2 | 125° C., 24 hours. |
| 3 | 500 | 22.9-25.1 | 41.8-49.1 | None. |
| 3A | 500 | 22.9-25.2 | 66.8-71.9 | 125° C., 24 hours. |
| 3B | 500 | 24.0-25.3 | 68.0-73.6 | 125° C., 88 hours. |
| 4¹ | 500 | 21.0-22.3 | 40.8-57.7 | None. |
| 4A¹ | 500 | 19.7-22.5 | 53.3-73.2 | 120° C., 24 hours. |
| 5² | 500 | 23.3-26.0 | 57.2-66.4 | None. |
| 5A² | 500 | 23.8-25.1 | 68.3-83.7 | 125° C., 24 hours. |
| 6³ | 505 | 19.2-25.0 | 26.7-40.9 | None. |
| 6A³ | 505 | 18.2-23.0 | 28.0-44.0 | 125° C., 24 hours. |

¹ 500° temperature held for 7 minutes before quenching.
² 500° temperature held for 12 minutes before quenching.
³ Some liquid state.

From the above it appears the melting point of the alloy foam was about 500° C. The rate of cooling appreciably slowed at that temperature probably due to the heat of fusion. Since the absence of liquid phase would take some time at that temperature, it appeared best to hold at that temperature for a period. As can be seen by comparing Runs 3, 4, and 5 the trend is to achieve greater strength while allowing solidification to occur.

EXAMPLE 2

A foam was prepared in general accordance with the procedure of Example 1. However, the foam casting was allowed to reach 400° C. and then removed from the mold and placed in a furnace for six hours at 495–500° C. While in the furnace the casting was kept in a nitrogen atmosphere. After the six-hour period the casting was rapidly quenched with a spray of tap water. Testing compressive strength as before yielded the following results,

|  | Foam density, p.c.f. | Foam strength p.s.i./p.c.f. | Treatment after quenching |
| --- | --- | --- | --- |
| Run— | | | |
| 7 | 24.0–26.8 | 55.2–59.7 | None. |
| 7A | 23.1–26.1 | 69.1–74.2 | 120° C., 24 hours. |

EXAMPLE 3

A sample of foam from 7075 alloy was made substantially in accordance with Example 1. However, the foam casting was allowed to reach ambient temperature; thereafter, it was heated at 490 or 495–500° C. for six hours in an oven with a nitrogen atmosphere. After the six-hour period, the casting was rapidly cooled by tap water. This was followed by a treatment at 125° C. for 24 hours. Testing and sampling as above yielded the following results.

|  | Temperature, °C. | Foam density, p.c.f. | Foam strength, p.s.i./p.c.f. |
| --- | --- | --- | --- |
| Run— | | | |
| 8 [1] | | 21.9–25.7 | 32.1–46.0 |
| 8 [2] | 490 | 21.9–26.0 | 59.5–80.0 |
| 9 [3] | | 24.9–26.5 | 49.2–50.2 |
| 9A [4] | 495–500 | 24.3–25.6 | 81.9–89.4 |

[1] Before heat treatment at 490° C.
[2] After heat treatment at 490° C.
[3] Before heat treatment at 495–500° C.
[4] After heat treatment at 495–500° C.

EXAMPLE 4

A mixture of 7001 alloy, 85 percent, and of Almag 35, 15 percent was melted; total charge 6840 grams. The mixture was thickened using 100 grams of carbon dioxide snow and stirring to yield a heavily viscous mass. Zirconium hydride, 27.4 grams in five aluminum foil wrapped packets of about 5 grams each was added while mixing for 10 seconds. The mixture was removed from the mix pot and placed in a mold 15" x 15" x 4½" of ½" steel as in above examples. The mold was filled about to 75 percent capacity.

After casting, sampling and testing was conducted as before. Using the above technique and varying amounts of hydride or metal as required, foam samples of the metal alloy were prepared having the density listed in the following table. The alloy had a composition as follows.

Mg ............................................ 3.5–4.5
Cu ............................................ 1.2–2.0
Zn ............................................ 5.1–6.0
Cr ............................................ 0.15–0.3
Fe ............................................ 0.35
Mn ............................................ 0.15
Ti ............................................ 0.15
Al ............................................ Remainder As cast no quench:

| Density pcf.: | Strength p.s.i./pcf. |
| --- | --- |
| 13–15 | 18–24 |
| 17–19 | 33–41 |
| 20–25 | 44–60 | cooled to ambient, then heat treated 3 hours at 900–910° F., spray quench and heated 24 hours at 255° F.

| Density pcf.: | Strength p.s.i./pcf. |
| --- | --- |
| 13–15 | 32–44 |
| 17–19 | 56–73 |
| 20–25 | 79–93 | quenched casting after it cooled to 900–910° F., then heated 255° F. 24 hours

| Density pcf.: | Strength p.s.i./pcf. |
| --- | --- |
| 19–23 | 54–69 |
| 19–23 | 64–83 |

Similar results are obtained using the techniques of the above examples when the foam is prepared using the processes of U.S. 2,895,819, 2,983,597, 3,300,296, and 3,297,431. Similar results are also obtained when the foam is prepared using the French patent application 7006045 or the techniques of Niebylski et al., U.S. application Ser. No. 123,099, filed Mar. 10, 1971, when argon, water, oxygen, nitrogen, or air is used as the thickening agent. Similar results are obtained using foams of density 8 to 30 pounds per cubic foot. Similar results are obtained when using other heat treatable aluminum alloys such as those containing 1 to 10 weight percent Cu, 1 to 15 weight percent silicon, and 0.5 to 10 weight percent zinc and up to 4 weight percent copper with or without up to 5 weight percent magnesium; such alloys being illustrated by alloys 2024, 2214, 7001, 7049, 7075.

In addition this invention can be extended to certain alloys which have not been noted for heat treatability such as a binary alloy of aluminum containing 9–10 percent magnesium, an Almag 35 composition modified to contain 4–5 percent zinc, and alloy 520 containing magnesium and zinc.

Similar results are obtained using the techniques of the above examples wherein the temperature used to obtain solid solution solutes is 1–35° C. below the foams melting point. Similar results are also obtained when, after quench, precipitation hardening is conducted at temperatures of 100° to 250° C.

The improved foams of this invention can be used wherever metal foams are applicable and are especially efficacious where higher strength is desirable. The foams can be used in transportation such as sides, bottoms, or tops of bins or other containers used for holding goods in shipment where light weight is desired. Likewise they may be used in trailer doors. They may also be used in construction of decking, floors, or curtain walls, both interior and exterior.

What is claimed is:

1. Process for increasing the compressive strength of a set foam of a heat-treatable aluminum alloy that will form a solid solution
    said process comprising maintaining said foam for from 10 minutes to about 36 hours at a temperature at which solid solution solute formation takes place, said temperature being below the melting point of said alloy;
and subsequently rapidly cooling said foam below said temperature.

2. Process for increasing the compressive strength of a set foam of a heat-treatable aluminum alloy that will form a solid solution
    said process comprising maintaining said foam for from 10 minutes to about 36 hours at a temperature within the range of from 1° C. below the melting point to about 35° C. below the melting point of said foam; and subsequently rapidly cooling said foam to near room temperature and thereafter heating said foam to a temperature of from about 100° C. to about 250° C. for a time within the range of from 1–125 hours hours, thereby further increasing the compressive strength of said foam.

3. A process of claim 1 wherein set foam was made from a foamable mass containing a gaseous viscosity-increasing agent selected from water, carbon monoxide, oxygen, nitrogen, air, and argon.

4. A foam of increased compressive strength produced by a process which comprises:
    (a) heating a set foam of a heat treatable aluminum alloy that will form a solid solution, said heating being for from 10 minutes to about 36 hours and at a temperature of from about 1–35° C. below the melting point of said foam, (b) subsequently rapidly cooling said foam to near room temperature, and thereafter, (c) heating said foam to a temperature of from about 100° C.–250° C. for a time within the range of from about 1–125 hours;

said foam made from a foamable mass containing a gaseous viscosity-increasing agent selected from water, carbon dioxide, oxygen, nitrogen, air, and argon.

5. Process of claim 1 wherein said temperature is within the range from about 1° C. below the melting point of said foam to about 35° C. below said melting point.

6. Process of claim 1 wherein said foam has a density of from about 8 to about 40 pounds per cubic foot.

7. Process of claim 1 wherein said aluminum alloy is substantially composed of aluminum alloyed with a metal selected from the class consisting of magnesium, copper, silicon, and zinc.

8. Process of claim 7 wherein said alloy contains from about 1 to about 10 weight percent copper.

9. Process of claim 7 wherein said alloy contains from about 1 to about 15 weight percent silicon.

10. Process of claim 7 wherein alloy contains from about 0.5 to about 10 weight percent zinc and up to about 4 weight percent copper.

11. Process of claim 7 wherein said alloys additionally contain up to about 5 weight percent magnesium.

References Cited
UNITED STATES PATENTS

| | | | |
|---|---|---|---|
| 2,826,496 | 3/1958 | Kegerise | 148—142 |
| 3,365,343 | 1/1968 | Vordahl | 148—142 |
| 3,164,497 | 1/1965 | Matsuda | 148—158 |
| 1,993,204 | 3/1935 | Beck | 148—15.5 |
| 2,983,597 | 5/1961 | Elliott | 75—20 R |
| 1,919,730 | 7/1933 | Koenig | 75—20 F |
| 3,087,807 | 4/1963 | Allen | 75—20 F |
| 2,553,016 | 5/1951 | Sosnick | 75—20 F |
| 3,224,846 | 12/1965 | Fiedler | 75—20 F |
| 3,219,491 | 11/1965 | Anderson | 148—159 |
| 3,429,695 | 2/1969 | Nakamura | 148—159 |

L. DEWAYNE RUTLEDGE, Primary Examiner

P. D. ROSENBERG, Assistant Examiner

U.S. Cl. X.R.

148—142